United States Patent [19]
Mauck

[11] 3,807,752
[45] Apr. 30, 1974

[54] VEHICLE WHEEL SUPPORT
[75] Inventor: Robert J. Mauck, Pinconning, Mich.
[73] Assignee: John J. Buta, Durand, Mich.
[22] Filed: July 21, 1972
[21] Appl. No.: 274,071

[52] U.S. Cl........ 280/81 R, 280/124 R, 267/57.1 A
[51] Int. Cl............................................. B60b 37/00
[58] Field of Search ............ 280/81 A, 81 R, 124 F, 280/124 R; 267/63 A, 57.1

[56] References Cited
UNITED STATES PATENTS
3,334,912   8/1967   Mauck ............................ 280/81 R
3,154,321   10/1964  McLean ......................... 280/124 F
2,576,824   11/1951  Bush ............................ 280/124 R X
2,251,416   8/1941   Parker ......................... 267/63 A X Primary Examiner—Stanley H. Tollberg
Assistant Examiner—John P. Shannon

[57] ABSTRACT

A vehicle wheel support for trailers and the like has a wheel support frame horizontally pivotally mounted on and beneath a main trailer frame. A longitudinally extending shaft is connected at one end to the wheel support frame by a resilient bushing having a laterally extending sleeve. The shaft is connected at the other end by a pin slidably engaged in a vertical slot formed in the wheel support frame, and cushioned by an air bag. A laterally extending axle is connected to the central portion of the longitudinal shaft and rotatably mounts a pair of wheels on the axle ends. The wheels, thus are mounted for general vertical movement about the lateral bushing sleeve, and separately for movement up and down along with the longitudinal shaft.

9 Claims, 12 Drawing Figures

VEHICLE WHEEL SUPPORT

CROSS REFERENCES TO RELATED PATENTS

The invention involves improvements upon the constructions shown in U.S. Pat. No. 3,334,912, issued Aug. 8, 1967.

BACKGROUND OF THE INVENTION

1. Field of the Invention

The invention relates to trailers and in particular to vehicle wheel supporting structures for trailers and the like. More particularly the invention relates to a vehicle wheel supporting structure in which a set of wheels is connected to a resiliently mounted longitudinally extending shaft for controlling movement of the wheels relative to the trailer frame.

2. Description of the Prior Art

Many types of prior vehicle wheel supporting structures have been provided for supporting trailers and similar types of vehicles, in order to overcome the numerous problems encountered with modern trailer constructions. These problems are described in detail in U.S. Pat. No. 3,334,912 relating to modern trailer constructions and to the road conditions encountered.

These problems have been greatly reduced by the constructions shown in the U.S. Pat. No. 3,334,912, wherein each set of wheels is movable about a longitudinally extending shaft, as well as pivotal up and down about a laterally extending axis.

These constructions, however, involve numerous mechanical and structural parts, movably interconnected by bearings, sleeves and the like. The parts require frequent maintenance and lubrication due to their movability with respect to each other. Likewise, a large number of replacement parts are required to be stocked for such constructions in case of damaged and broken components.

It is desirable to provide a vehicle wheel support having a minimum number of movable parts, yet which enables a set of wheels in a pair to rotate up and down about a laterally extending horizontal axis, and either wheel of the pair to raise to absorb road forces during straight line travel and during turning maneuvers.

No vehicle wheel support of which I am aware has eliminated the many problems encountered by modern, high speed, heavily loaded trailers by providing a vehicle wheel support having a set of wheels supported by a longitudinal shaft, which is resiliently mounted on one end by a resilient bushing which enables various directional movements of the set of wheels, and which permits independent movement of the wheels with respect to each other and with respect to the trailer body.

SUMMARY OF THE INVENTION

Objectives of the invention include providing an improved vehicle wheel support for trailers and the like which includes improved overall supporting structures, improved cushioning structures, and where required and desirable, improved self-turning structures; providing an improved vehicle wheel support in which various wheel assemblies at various locations along the lengths of trailers are made up of individually supported sets of wheels, with a separate and independent axle for each of these sets of wheels; providing an improved vehicle wheel support in which the wheels of each set are mounted for raising or lowering movement relative to one another, as well as for general vertical pivotal movement about a laterally extending axis, and also horizontal pivotal movement about a vertical axis for aiding in turning the supported vehicle; providing an improved vehicle wheel support having a reduced number of moving parts heretofore required for similar vehicle wheel supports; providing an improved vehicle wheel support having a resilient bushing mounting a longitudinally extending shaft for each set of wheels which enables the set of wheels to achieve the above-described movements, and which provides improved trailer cushioning; and providing an improved vehicle wheel support which satisfies all of the above objects in a simple and efficient manner, and at a minimum cost.

These objectives and advantages are obtained by the improved vehicle wheel support for trailers and the like, the general nature of which may be stated as including a main trailer frame; a wheel supporting frame mounted for horizontal pivotal movement on and beneath the trailer frame; a pair of laterally spaced wheels; means mounting the wheels on the wheel supporting frame for raising and lowering movement about a laterally extending axis, and for general vertical movement of the wheels up and down relative to one another and with respect to the main trailer frame; the wheel mounting means including axle means extending laterally between and connected to the spaced wheels for rotatably supporting the wheels; longitudinal shaft means extending between the spaced wheels and connected to the lateral axle means intermediate the wheels and the ends of the shaft; the longitudinal shaft means having first and second ends; bushing means mounting the first end of the longitudinal shaft means on the wheel supporting frame; resilient means operably connecting the longitudinal shaft means second end to the wheel support frame; and the bushing means having a laterally extending sleeve mounted on the wheel supporting frame; a resilient member bonded to and surrounding a portion of the sleeve, and shell means attached to the first end of the longitudinal shaft means, substantially enclosing the resilient member.

BRIEF DESCRIPTION OF THE DRAWINGS

A preferred embodiment of the invention — illustrative of the best mode in which applicant has contemplated applying the principles — is set forth in the following description and shown in the accompanying drawings, and is particularly and distinctly pointed out and set forth in the appended claims.

FIG. 8 is a fragmentary sectional view taken on line 8—8, FIG. 6;

Similar numerals refer to similar parts throughout the drawings.

DESCRIPTION OF THE PREFERRED EMBODIMENT

Figure 1:
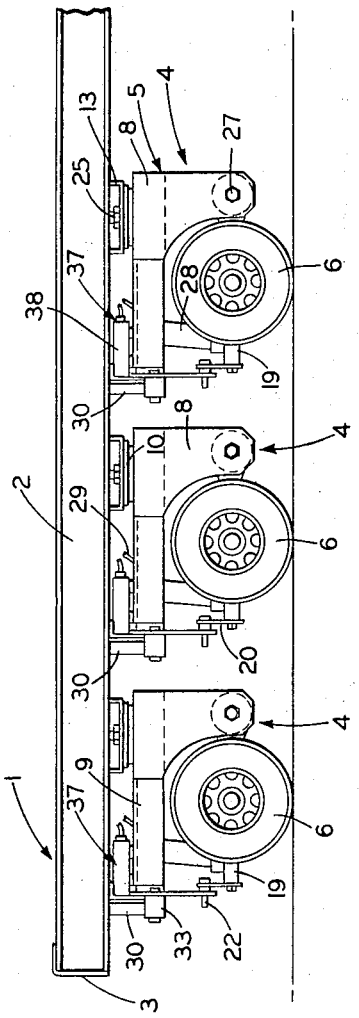
FIG. 1 is a fragmentary side elevation of a trailer incorporating the improved vehicle wheel support construction of the present invention.
Figure 2:
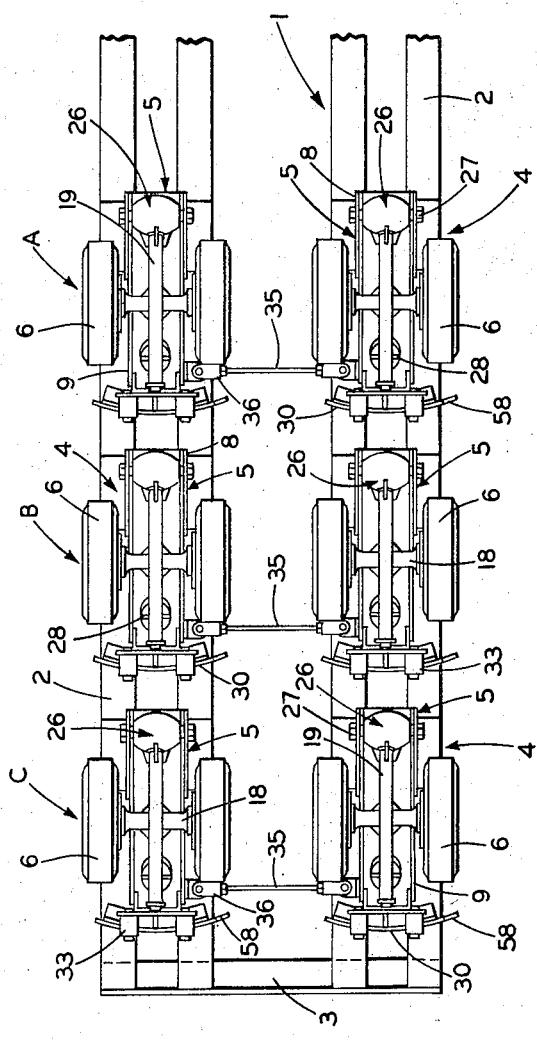
FIG. 2 is a bottom plan view of the construction shown in FIG. 1.

The improved vehicle wheel support construction is shown in FIGS. 1 and 2 supporting a usual trailer bed 1 formed by a plurality of longitudinal beams 2 and crossbeams 3. Any form of trailer construction may be mounted on trailer bed 1.

Trailer bed 1 is shown supported by three pairs of the improved vehicle wheel support assemblies, each assembly being indicated at 4. The three pairs of assemblies 4 comprise the front assembly pair A, the intermediate assembly pair B, and the rear assembly pair C. The two assemblies 4 in each front, intermediate and rear pair are axially aligned and laterally spaced, and each assembly 4 has a pair of laterally spaced wheels 6 mounted thereon.

Figure 3:
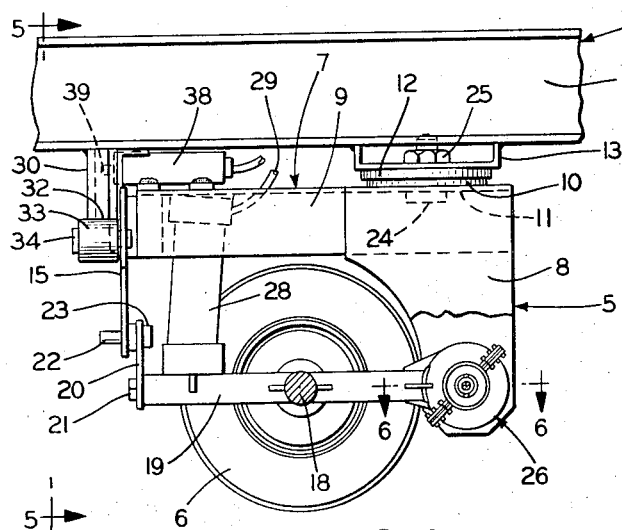
FIG. 3 is an enlarged fragmentary side elevation of the improved vehicle wheel support.
Figure 5:
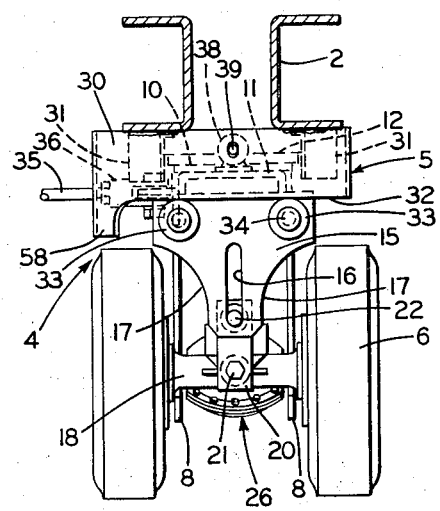
FIG. 5 is a fragmentary rear elevation of the vehicle wheel support shown in FIGS. 3 and 4, taken on line 5—5, FIG. 3.
Figure 4:
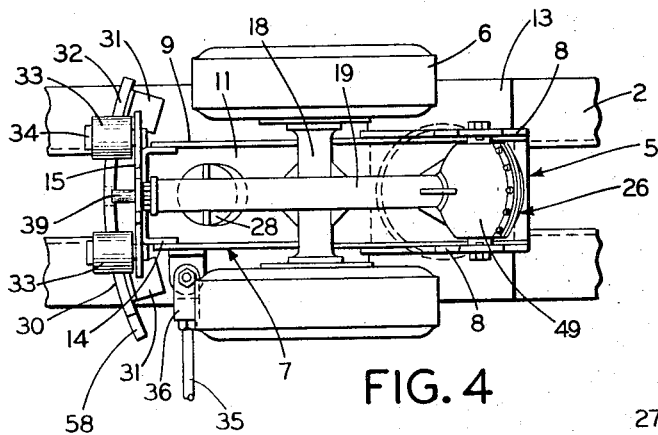
FIG. 4 is a fragmentary bottom plan view of the vehicle wheel support shown in FIG. 3.
Figure 9:
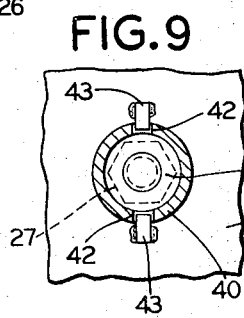
FIG. 9 is a fragmentary sectional view taken on line 9—9, FIG. 6.

Referring particularly to FIGS. 3, 4 and 5, each wheel support assembly 4 has a wheel support frame, indicated generally at 5, which is pivotally mounted on and beneath trailer bed 1 by bolt 24 and nut 25. Pivot bolt 24 forms the vertical axis about which wheel support assembly 4 may rotate horizontally.

Wheel support frame 5 is formed by a top inverted U-shaped channel 7 which extends horizontally longitudinally beneath trailer bed 1 during usual straight-line travel of trailer 1. A pair of spaced axle mounting plates 8 extend vertically downwardly from the forward end of top channel 7. Plates 8 are attached to flanges 9 of channel 7 by welding or other suitable fastening means.

A pivot plate 10 is attached to the top of web 11 of channel 7, and slidably engages a similar pivot plate 12 attached to a bracket 13 which is mounted on the bottom of beams 2. Relative rotative movement between pivot plates 10 and 12 may take place with reduced friction by providing grease slots in the plates or bearings between the plates. Pivot bolt 24 extends through aligned central openings formed in plates 10 and 12.

A vertical channel 14 is attached to and extends between flanges 9 at the rear end of channel 7. An end plate 15 is attached to channel 14 and extends vertically downwardly therefrom and is formed with a vertical slot 16 (FIG. 5). The lower corner portions of plate 15 are arcuately notched at 17 to provide sufficient clearance for turning movement of wheels 6.

Spaced wheels 6 are mounted on a laterally extending axle 18, which is, in turn, secured to the central portion of a longitudinally extending shaft 19. An upwardly, vertically extending plate 20 is bolted at 21 to the rear end of longitudinal shaft 19, and a horizontal pin 22 extends rearwardly therefrom. Pin 22 is connected by spaced bolts 23 to plate 20 and is slidably engaged in end plate slot 16.

In accordance with the invention the forward end of longitudinal shaft 19 is connected to a resilient mounting bushing, generally indicated at 26, the details of which are described below. Bushing 26 extends between axle mounting plates 8 and is mounted on the plates 8 by bolts 27.

The rear end of longitudinal shaft 19 is supported by a usual air bag 28 which is connected to and extends between shaft 19 and web 11 of channel 7. Air bag 28 is connected by air line 29 to a common manifold (not shown) to which other air lines similar to line 29 from the other wheel assemblies 4 are connected. Control equipment for regulating the air pressure within bag 28 is located on trailer 1, and is controlled by the driver of the trailer. Thus, the desired degree of cushioning is controlled and maintained easily by the driver, by adjusting the air pressure within bag 28.

In order to aid in supporting the load on trailer frame beams 2 during turning movement on pivot plates 10 and 12, a generally laterally extending arcuate track member 30 is mounted on beams 2 by spaced brackets 31. Track member 30 is spaced rearwardly of axle 18 and extends downwardly from beams 2. Track member 30 is formed with a downwardly exposed roller track surface 32.

A pair of laterally spaced rollers 33 is secured to end plate 15 and extends horizontally rearwardly therefrom. Rollers 33 are journaled on stub axles 34 which are secured to end plate 15. Rollers 33 engage roller track surface 32 of track member 30 providing a roller support for wheels 6 during the pivotal turning movement of wheel support frame 5 and attached wheels 6 on pivot bolt 24. The track member 30 preferably is curved on a radius extending from pivot bolt 24.

A tie bar 35 extends between the inner axle support plate 8 of each wheel support assembly 4 and the inner axle support plate of the laterally adjacent wheel support assembly 4 of each pair A, B or C, in order to coordinate the pivotal movement for turning of the two sets of wheels 6 in each pair of wheel assemblies A, B and C (FIG. 2). Bar 35 is secured to plates 8 by a pin-clevis mechanism 36.

A locking mechanism 37 may be mounted on one channel 7 of one wheel support assembly 4, of each pair of wheel assemblies A, B and C, selectively engageable with a track member 30 for holding the sets of wheels 6 against turning movement on pivot bolts 24.

A remotely controlled air or hydraulic cylinder 38 actuates a lock bolt 39, which may engage an opening in track member 30 (FIG. 4). Any bolt 39 thus selectively locks the particular set of wheels 6 against turning movement, and through tie bar 35, also locks the laterally adjacent set of wheels 6.

Front and rear wheel assemblies A and C normally will be unlocked and free to turn in any direction, for usual road operation. Intermediate wheel assembly B normally is locked for usual road operation. All three wheel assemblies preferably are locked for straight rearward backing maneuvers, and all three wheel assemblies will be unlocked for sidewise movement.

Bushing 26 (FIGS. 6–9) has a laterally extending sleeve 40 which supports one end of longitudinal axle 19 on mounting plates 8. Nuts 41 are secured within each end of sleeve 40 engaged by bolts 27. Keyways 42 are formed in each end of sleeve 40 into which keys 43 extend preventing rotation of sleeve 40 with respect to plates 8. Keys 43 preferably are welded to plates 8.

A center ring or reinforcing plate 44, formed with a plurality of openings 45, is welded at 46 to the central portion of sleeve 40, extending normal to the axis of sleeve 40. A general ellipsoidally-shaped member 47, formed of a flexible, resilient composition, such as neoprene, is bonded to and surrounds sleeve 40 and plate 44. The axis of sleeve 40 forms the major axis of member 47. The neoprene in member 47 extends through the openings 45 in ring 44 to aid in preventing separation of the bond of member 47 with ring 44 by forces resulting from movement of longitudinal shaft 19.

An outer metal shell 49 (FIGS. 6 and 7) encloses member 47, except for exposed end portions 50 and 51 of member 47. Shell 49 consists of half-sections 52 and 53, each terminating in outwardly projecting flanges 54 which are secured together by bolts 55, compressing member 47 within shell 49.

Longitudinal shaft 19 is welded at 56 to shell section 52, and a plurality of reinforcing gussets 57 extend between shaft 19 and shell section 52.

Bushing 26 performs a similar function in the improved vehicle wheel support construction as heretofore was performed by numerous mechanical components, such as sleeves pivotally mounting the longitudinal shaft as shown in the U.S. Pat. No. 3,334,912.

Figure 6:
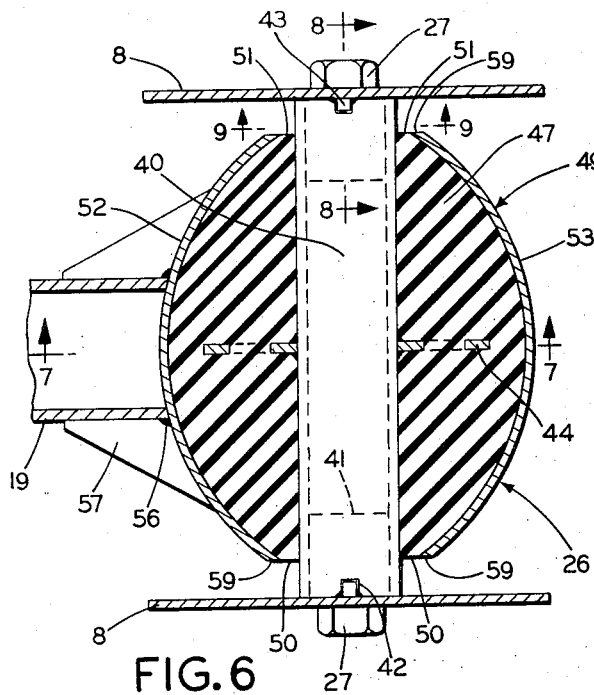
FIG. 6 is a further enlarged fragmentary sectional view showing the vehicle wheel support mounting bushing, taken on line 6—6, FIG. 3.
Figure 7:
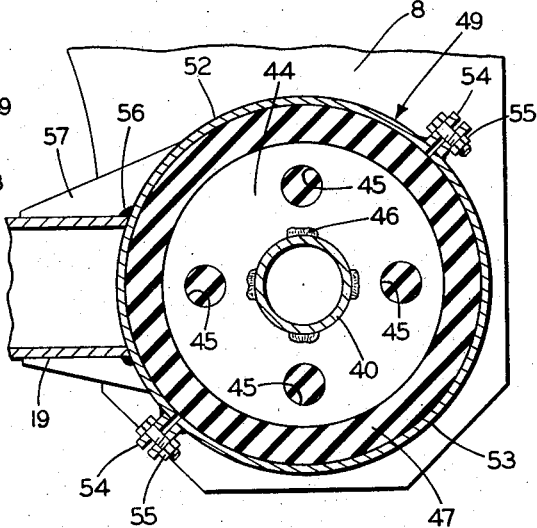
FIG. 7 is a fragmentary sectional view taken on line 7—7, FIG. 6.

In normal straight-line driving, shaft 19 is generally longitudinally aligned with trailer beams 2, as shown in FIG. 2, and bushing 26 assumes the position shown in FIG. 6. Wheel assembly 4 will pivot horizontally on bolt 24 when trailer 2 negotiates a turn or curve, with rollers 33 moving along roller track surface 32. Stops 58 (FIG. 5) extend downwardly from one end of each track surface 32, and contact rollers 33 to limit the turning angle of the trailer.

Figure 10:
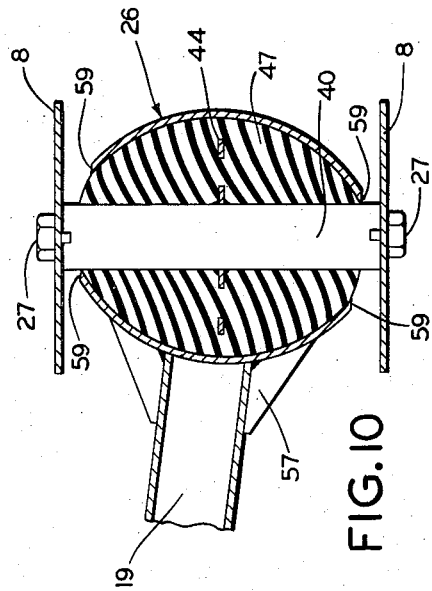
FIG. 10 is a general diagrammatic fragmentary sectional view, similar to FIG. 6, showing the mounting bushing during turning movement of the trailer.

Road forces exerted on wheels 6 and on the supporting mechanism due to a turning maneuver, will be effectively absorbed by bushing 26, as best illustrated in FIG. 10. The forces are transmitted from wheels 6 through axle 18 and shaft 19, imparting a twisting motion or force on bushing 26. Resilient member 47 deforms under this twisting motion absorbing the turning force, thus reducing the lateral forces exerted on and heretofore absorbed by the trailer tires and wheel supporting mechanism.

Exposed resilient member end portions 50 and 51, defined by the distance between the I.D. of the edges 59 of shell 49 and the O.D. of sleeve 40 (FIGS. 6 and 10), permit only a limited twisting movement of shell 49 with respect to sleeve 40 with edges 59 of shell 49 acting as stops against sleeve 40. Edges 59 engage sleeve 40 to limit the oscillation of the axle assembly, thereby maintaining a cushioned but firm riding action for trailer 1.

A similar twisting action is absorbed by resilient member 47 to provide a smoother and more controlled ride, when a single wheel 6 of a pair of the wheels, rolls over a "bump" or into a "hole" in the roadway, which bump or hole is not encountered by the adjacent wheel 6 of the pair. Heretofore, such twisting force was absorbed directly by the axle and tires.

Figure 12:
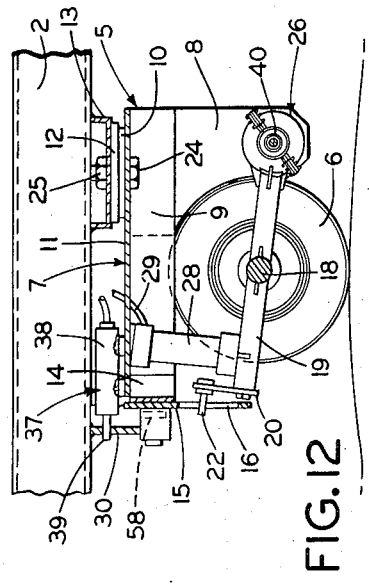
FIG. 12 is a general diagrammatic fragmentary sectional view, similar to FIG. 3, showing the improved vehicle wheel support passing over a raised area in a roadway.

Bushing 26 also permits wheels 6 to move in a general vertically pivotal motion about laterally extending sleeve 40, and provides additional cushioning means together with air bag 28 for wheels 6, and axle 18 and shaft 19. Wheels 6 of wheel assemblies A, B and C, upon passing over a bump or rise in the roadway, as illustrated in FIG. 12, will pivot generally vertically about sleeve 40 with pin 22 sliding vertically within slot 16 of end plate 15.

Figure 11:
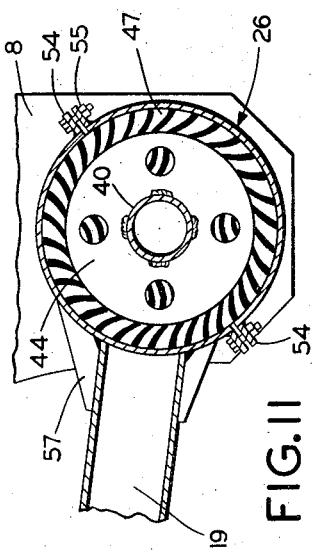
FIG. 11 is a general diagrammatic fragmentary sectional view, similar to FIG. 7, showing the mounting bushing during vertical movement of the trailer wheels.

Shaft 19 and bushing shell 49 will move about sleeve 40 exerting a twisting force on resilient member 47, as shown in FIG. 11, due to the compression force exerted by shell 49 on member 47 and due to the bonding of member 47 to sleeve 40. The length of shaft 19 permits pin 22 to move a considerable distance within slot 16 relative to the small angular movement of shell 49 about sleeve 40. Thus, the twisting force exerted on member 47 will not be substantial or cause breakdown of member 47 and separation from sleeve 40.

The resistance exerted by member 47 upon the general vertical movement of shaft 19 and wheels 6 due to the elasticity of member 47, provides a firm, yet cushioned riding action for trailer 1. Prior structures having freely pivotally mounted axle supports rely entirely upon springs, air bags or other means mounted on the opposite axle end for absorbing road shocks and forces.

Thus, according to the principles of the present invention, the improved vehicle wheel support mounts the individual set of wheels 6 of each trailer wheel assembly for movement in a generally vertical plane about a generally longitudinal shaft, for pivotal movement in a generally vertical plane about a generally lateral axis, and for pivotal movement in a generally horizontal plane about a vertical axis, with a reduced number of movable components as compared to those heretofore required with known vehicle wheel supports.

In the foregoing description, certain terms have been used for brevity, clearness and understanding, but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details of the construction shown or described.

Having now described the features, discoveries and principles of the invention, the manner in which the improved vehicle wheel support is constructed, assembled and operated, the characteristics of the new construction, and the advantageous, new and useful results obtained; the new and useful structures, devices, elements, arrangements, parts, and combinations are set forth in the appended claims.

I claim:

1. An improved wheel supporting structure for trailers and the like including a main trailer frame; a wheel supporting frame mounted on and extending beneath the trailer frame; a pair of laterally spaced wheels; means mounting the wheels on the wheel supporting frame including axle means extending laterally between and connected to the spaced wheels for rotatably supporting the wheels; longitudinal shaft means extending between the spaced wheels and connected to the lateral axle means intermediate the wheels; the longitudinal shaft means having first and second ends; bushing means mounting the first end of the longitudinal shaft means on the wheel supporting frame; resilient means operably connecting the longitudinal shaft means second end to the wheel support frame; the bushing means having a laterally extending sleeve immovably fixed to the wheel supporting frame, a resilient member bonded to and surrounding a portion of the sleeve, reinforcing means imbedded within and bonded to the resilient member and being connected to the bushing sleeve and extending radially outwardly therefrom, and shell means attached to the first end of the longitudinal shaft means, substantially enclosing and compressing the resilient member within the outer shell whereby movement of the longitudinal shaft means deforms the resilient member cushioning the forces on the wheels, and whereby the wheels are mounted for movement about the laterally extending bushing sleeve, and individually for up and down movement relative to one another.

2. The construction defined in claim 1 including means pivotally mounting the wheel support frame on and beneath the trailer frame for horizontal pivotal movement about a vertical axis of the wheels and wheel support frame with respect to the trailer frame.

3. The construction defined in claim 2 in which stationary roller track means is mounted on the trailer frame; in which roller means are rotatably mounted on the wheel supporting frame; and in which the roller means are engageable with the roller track means for roller supporting the wheel support frame during pivotal movement of the wheel support frame about the vertical axis.

4. The construction defined in claim 2 in which lock means is operably connected between the main frame and the wheel support frame for selectively locking the wheel support frame against horizontal pivotal movement about the vertical axis.

5. The construction defined in claim 1 in which the wheel support frame includes an end plate; in which a vertically extending slot is formed in the end plate; and in which the longitudinal shaft means second end includes pin means engageable in said slot, whereby the slot limits movement of the shaft.

6. The construction defined in claim 1 in which the bushing means resilient member is formed of neoprene and has a generally ellipsoidal shape.

7. The construction defined in claim 1 in which the resilient means operably connecting the longitudinal shaft means second end to the wheel support frame includes air bag means.

8. The construction defined in claim 1 in which the reinforcing means is a ring-like member; and in which a plurality of openings are formed in said ring-like member whereby the resilient member is integrally joined through said openings.

9. An improved wheel supporting structure for trailers and the like including a main trailer frame; a wheel supporting frame mounted on and extending beneath the trailer frame; a pair of laterally spaced wheels; means mounting the wheels on the wheel supporting frame including axle means extending laterally between and connected to the spaced wheels for rotatably supporting the wheels; longitudinal shaft means extending between the spaced wheels and connected to the lateral axle means intermediate the wheels; the longitudinal shaft means having first and second ends; bushing means mounting the first end of the longitudinal shaft means on the wheel supporting frame; resilient means operably connecting the longitudinal shaft means second end to the wheel support frame; the bushing means having a laterally extending sleeve immovably fixed to the wheel supporting frame, a resilient member bonded to and surrounding a portion of the sleeve, shell means attached to the first end of the longitudinal shaft means substantially enclosing and compressing the resilient member within the outer shell whereby movement of the longitudinal shaft means deforms the resilient member thereby cushioning the forces on the wheels; and a reinforcing ring connected to the bushing sleeve and being imbedded within and bonded to the resilient member, said reinforcing ring being formed with a plurality of openings whereby the resilient member is integrally joined through said openings; and whereby the wheels are mounted for movement about the laterally extending bushing sleeve, and individually for up and down movement relative to one another.

* * * * *